(12) United States Patent  (10) Patent No.: US 7,721,065 B2
Tsuji  (45) Date of Patent: May 18, 2010

(54) REDUCING MEMORY FRAGMENTATION BY LEARNING MEMORY ALLOCATION PATTERNS

(75) Inventor: Syuntaro Tsuji, Osaka (JP)

(73) Assignee: Kyocera Mita Corporation (JP)

( * ) Notice: Subject to any disclaimer, the term of this patent is extended or adjusted under 35 U.S.C. 154(b) by 412 days.

(21) Appl. No.: 11/903,978

(22) Filed: Sep. 25, 2007

(65) Prior Publication Data

US 2008/0082780 A1    Apr. 3, 2008

(30) Foreign Application Priority Data

Sep. 28, 2006 (JP) ............................ 2006-264585
Sep. 28, 2006 (JP) ............................ 2006-264591

(51) Int. Cl.
*G06F 12/00*    (2006.01)
(52) U.S. Cl. ..................................... 711/170
(58) Field of Classification Search ....................... None
See application file for complete search history.

(56) References Cited

U.S. PATENT DOCUMENTS 6,625,673 B1    9/2003    Dickey et al.

FOREIGN PATENT DOCUMENTS

CN          1625248       6/2005
JP         2005-73004     3/2005

*Primary Examiner*—Kevin Verbrugge
(74) *Attorney, Agent, or Firm*—Gerald E. Hespos; Michael J. Porco (57) ABSTRACT

A memory management unit including: a first memory portion in which a memory area is allocated; a memory allocation processor for allocating and releasing a memory area in the first memory portion; a second memory portion for storing reserve area information regarding a memory area which should be reserved in an upper or lower address area of the first memory portion; and a learning reservation processor for monitoring the memory area allocation and release executed in the memory portion, allowing the information regarding the memory area which fragments the first memory portion to be stored in the second memory portion as the reserve area information. The learning reservation processor gives an instruction to the memory allocation processor to reserve a memory area according to the reserve area information, and the memory allocation processor reserves the memory area according to the reserve area information.

16 Claims, 4 Drawing Sheets

| ORDER | CAPACITY |
|---|---|
| 1 | 1024KB |
| 2 | 100KB |
| 3 | 256KB |
| 4 | 32KB |
| 5 | 96KB |
| 6 | 512KB |
| 7 | 4KB |
| 8 | 100KB |
| 9 | 2048KB |

FIG. 5B

| RANGE | ORDER |
|---|---|
| ~256B | |
| 256B~ 1KB | |
| 1KB~ 4KB | 7 |
| 4KB~ 16KB | |
| 16KB~ 64KB | 4 |
| 64KB~256KB | 2,3,5,8 |
| 256KB~1024KB | 1,6 |
| 1024KB~ | 9 |

REDUCING MEMORY FRAGMENTATION BY LEARNING MEMORY ALLOCATION PATTERNS

BACKGROUND OF THE INVENTION

1. Field of the Invention

The present invention relates to a memory management unit and a memory management method. More particularly, it relates to a memory management unit and a memory management method favorable to manage a memory installed in an electronic device.

2. Description of the Related Art

In a memory installed in an electronic device such as a computer, memory areas which are necessary for respective operations of internal devices and external devices such as a printer are allocated when the computer is started up, and the allocation is released in accordance with the progress of processing to form unused memory area.

In such memory, a fragmentation of memory area (fragmentation of unused memory area) occurs when a part of the allocated memory areas is released.

Figure 6A:
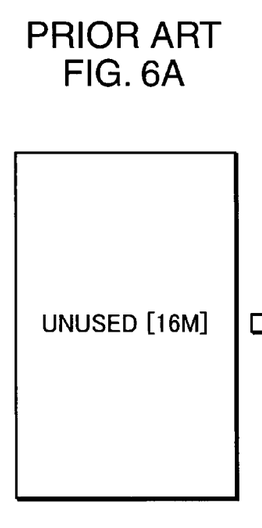
FIGS. 6A-6C show a conventional memory management.
Figure 6B:
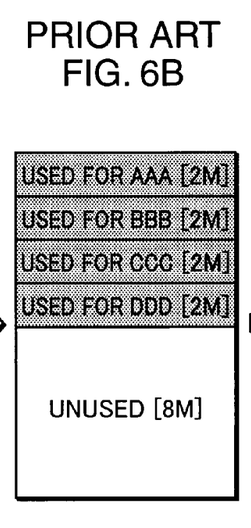

Specifically, in a memory area having unused area of 16M (byte) as shown in FIG. 6A, the unused area is reduced to 8M when 2M allocation (holding of area) is performed for four times (USED FOR AAA, USED FOR BBB, USED FOR CCC, USED FOR DDD) as shown in FIG. 6B.

Figure 6C:
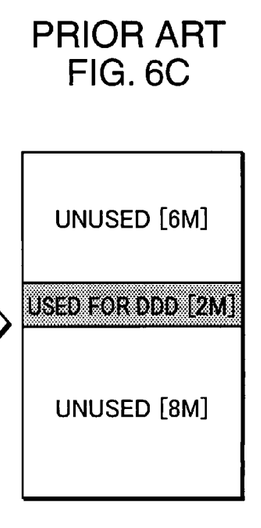

Thereafter, when the allocations of the initial three memory areas (USED FOR AAA, USED FOR BBB, USED FOR CCC) are released as shown in FIG. 6C, a maximum size of the allocable memory area remains 8M even though there are 14M (6M+8M) of unused memory areas in total. Therefore, the unused memory area of 14M is in a state of being fragmented, thereby causing the fragmentation.

In such state of memory, large and successive memory blocks cannot be held. Therefore, a garbage-collection function for assembling unused memory areas is executed. The garbage-collection function is one of functions of an OS (Operating System) to eliminate the fragmentation.

Further, there are various other technologies to eliminate the fragmentation. For example, a method disclosed in Japanese Patent Unexamined Publication No. 2005-73004 is also one of them.

However, the above-described garbage collection operation executed to eliminate the fragmentation occupies a CPU for a long time. Therefore, a means for preventing the fragmentation from occurring is desired. However, any effective solution cannot be found in the current situation.

Since the CPU cannot be occupied for eliminating the fragmentation especially in a real-time OS, the garbage collection operation is less used.

Further, in the invention disclosed in the Japanese Patent Unexamined Publication No. 2005-73004, it is required to manage memory areas of two or more memories. Therefore, since the CPU is occupied for a long time like the case of the above-described garbage-collection operation, it cannot be said it is an effective solution.

SUMMARY OF INVENTION

Therefore, the inventor observed and studied memory areas which are allocated for an HDD, a network interface, a printer and the like when a computer is started up. As a result, for example, the inventor found out that an order of allocating a memory area for a printer is substantially fixed, and a parameter setting of the order of allocation is not frequently changed, so the allocated memory area remains fixed. Further, the inventor found out that the memory area allocation for a printer is hardly released. In view of the above, the present invention was accomplished.

An object of the present is to provide a memory management unit and its memory management method to make the fragmentation of a memory, in which a plurality of memory areas are allocated, be hard to occur.

A memory management unit according to one aspect of the present invention comprises: a first memory portion in which a memory area necessary for operating a device is allocated; a memory allocation processor for allocating a memory area in the first memory portion in accordance with an allocation request inputted when the device is operated, and releasing the memory area allocated in the first memory portion in accordance with a releasing request inputted when the operation of the device is terminated; a second memory portion for storing reserve area information regarding a memory area which should be reserved in an upper or lower address area of the first memory portion for operation of a device; and a learning reservation processor for monitoring the memory area allocation and release executed by the memory allocation processor, determining a memory area which is necessary for the operation of a device and fragments the first memory portion, and allowing information regarding the determined memory area to be stored as the reserve area information in the second memory portion. The learning reservation processor gives an instruction to the memory allocation processor to hold a memory area according to the reserve area information in the upper or lower address area of the first memory portion when the first memory portion is initialized, and the memory allocation processor holds the memory area according to the reserve area information in the upper or lower address area of the first memory portion in accordance with the instruction given by the learning reservation processor.

In the above-described memory management unit, the memory allocation processor holds and releases a memory area in the first memory portion in accordance with an allocation request, and the learning reservation processor monitors the memory area and release in the first memory portion, creates reserve area information regarding the memory area which fragments the first memory portion, stores the reserve area information in the second memory portion, and gives an instruction to the memory allocation processor to hold the memory area according to the reserve area information in the upper or lower address area of the first memory portion when the first memory portion is initialized. Accordingly, the fragmentation of the first memory portion can be suppressed.

These and other objects, features and advantages of the present invention will become more apparent upon reading of the following detailed description along with the accompanied drawings.

DETAILED DESCRIPTION OF THE PREFERRED EMBODIMENTS

Hereinafter, embodiments of the present invention will be described with reference to the drawings. The like parts are identified with the same reference numerals, and description of the parts identified with the same reference numerals in the drawings will be omitted appropriately.

First Embodiment

Figure 1:
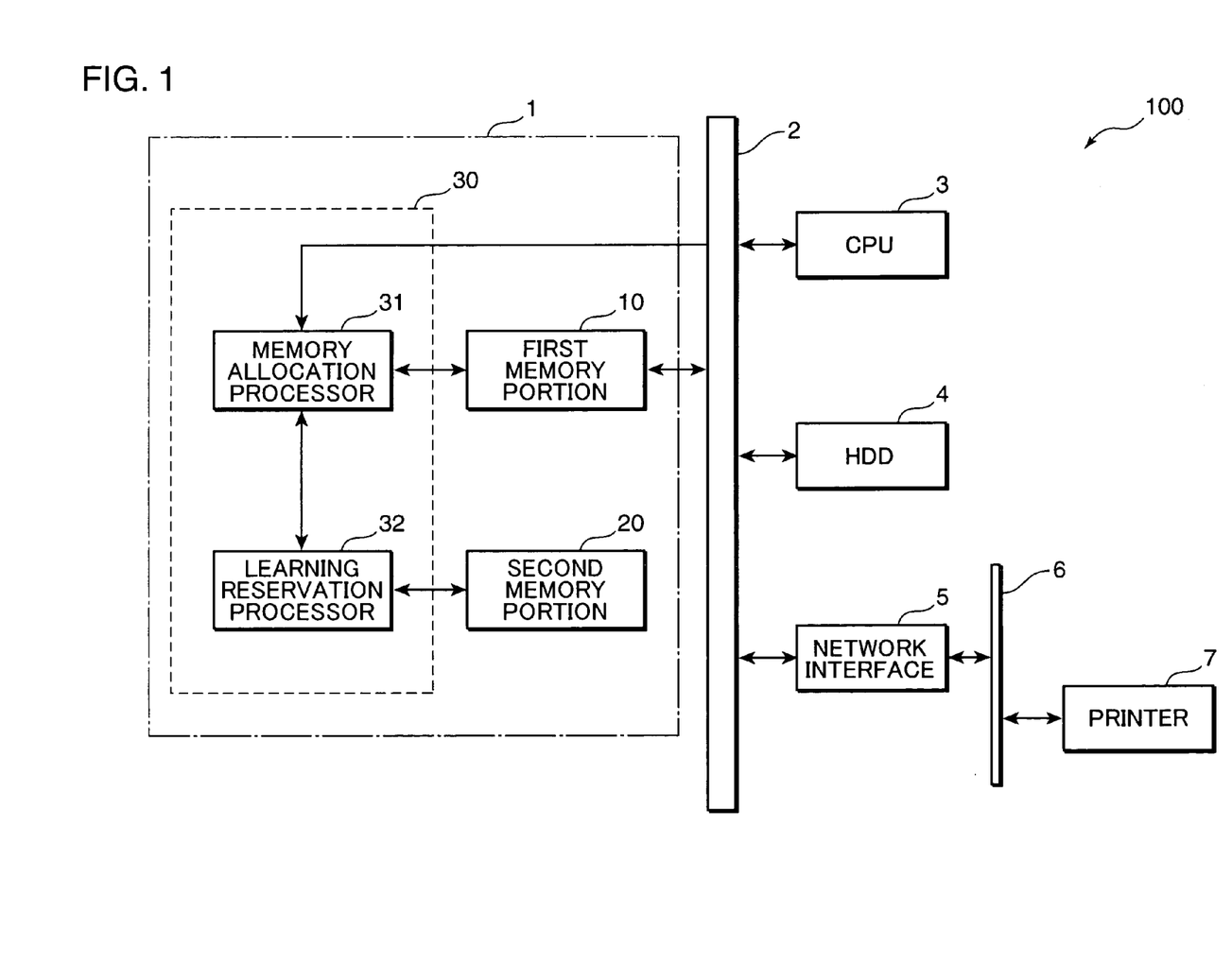
FIG. 1 is a block diagram showing a configuration of a computer in which a memory management unit according to a first embodiment of the present invention is installed.

FIG. 1 is a block diagram showing a configuration of a computer in which a memory management unit according to the first embodiment of the present invention is installed. An operation of the memory management unit according to the first embodiment of the present invention, in other words, a memory management method according to the first embodiment of the present invention will be described herebelow in the course of description of the operation of the memory management unit.

A memory management unit 1, which is depicted in FIG. 1, according to the present embodiment includes a first memory portion 10, a second memory portion 20, and a controller 30. The memory management unit 1 according to the present embodiment is connected to a system bus 2. The system bus 2 is used for transmitting various data between the memory management unit 1, a CPU 3, an HDD 4, and a network interface 5 constituting a computer 100 of FIG. 1. Further, a local bus 6 is connected to the network interface 5, and a printer 7 is externally connected to the computer 100 through the local bus 6.

The first memory portion 10 of the memory management unit 1 according to the present embodiment is, for example, a main memory (buffer memory) of the computer 100. The first memory portion 10 is a readable-and-writable memory portion in which memory areas necessary for respective operations of internal and external devices of the computer 100 such as the CPU 3, the HDD 4, the network interface 5, and the externally connected printer 7 constituting the computer 100. As the first memory portion 10, for example, a high speed readable-and-writable DRAM is used. The controller 30 executes a management of the memory area, such as a memory area allocation and release in the first memory portion 10.

As shown in FIG. 1, the controller 30 of the memory management unit 1 according to the present embodiment includes a memory allocation processor 31 and a learning reservation processor 32. The controller 30 is adapted to execute various arithmetic processing. Specifically, the controller 30 manages and controls the memory area allocation and release in the first memory portion 10. The controller 30 is configured, as depicted in FIG. 1, to be independent from the CPU 3, but it may be internally provided in the CPU 3.

The memory allocation processor 31 of the controller 30 according to the present invention executes respective processing of allocation, release of the allocation, and initialization of the memory area in the first memory portion 10 in accordance with an allocation request of the memory area of the first memory portion 10 and an allocation releasing request, and an initializing request of the memory area in the first memory portion 10 which are inputted through, for example, the system bus 2.

A management of the above-described allocation request, releasing request and initializing request is generally performed by an operating system (OS). The OS is stored, for example, in the HDD 4 and executed by the CPU 3, and manages the memory area of the first memory portion 10 by using the memory allocation processor 31. Specifically, the OS outputs the above-described allocation request, releasing request and initializing request to the memory allocation processor 31 to give instructions to the memory allocation processor 31 to allocate and release memory areas having sizes necessary for respective operations of the internal and external devices of the computer such as the CPU 3, the HDD 4, the network interface 5 and the externally connected printer 7 and initialize the memory area of the first memory portion 10.

In this way, the memory allocation processor 31 reserves necessary memory area among unused memory areas of the first memory portion 10 in accordance with the allocation request and releases the allocated memory areas in accordance with the releasing request, or initializes the memory area of the first memory portion 10 in accordance with the initializing request.

Further, when the above-described allocation request and releasing request are inputted, the memory allocation processor 31 performs the memory area allocation and release in the first memory portion 10 as described above, and creates allocation information regarding the memory area of the first memory portion 10. The allocation information is created in accordance with a processing executed by the memory allocation processor 31 and includes determination information for determining allocated or released memory area, information regarding a size and block number of the allocated or released memory area, allocation/release information specifying a type of allocation or release, and used area size information specifying a size of a currently used area of the memory area in the first memory portion 10. The memory allocation processor 31 outputs the allocation information to the learning reservation processor 32 in accordance with a request from the learning reservation processor 32.

Further, when the computer is started up, the memory allocation processor 31 initializes the first memory portion 10 and performs reserve allocation of the memory area in the first memory portion 10 according to the reserve area information obtained from the learning reservation processor 32. The reserved memory area may be located at a front end or rear end of the memory area in the first memory portion 10. The reserve area information will be described hereinafter.

The learning reservation processor 32 of the controller 30 according to the present embodiment requests allocation information to the memory allocation processor 31 appropriately and obtains the allocation information. The learning reservation processor 32 confirms a size, block number information, and the order of allocation and release of memory area to which the allocation or release is executed among the memory area in the first memory portion 10 in accordance with the allocation information requested appropriately. According to the confirmation result, the learning reservation processor 32 searches and determines a specific memory area (fragmenting memory area) which is generated by the previously executed allocation and release and fragmenting (dividing) the memory area of the first memory portion 10.

For example, in FIGS. 6A-6C described in the Background of Invention, four memory areas (AAA, BBB, CCC, DDD) are allocated, and thereafter three memory areas (AAA, BBB, CCC) of those are released. Consequently, the unused memory area falls in a state of being fragmented, and the fragmentation occurs. In this case, the learning reservation processor 32 determines the memory area DDD causing this fragmentation and confirms its size, block number, the order of allocation as information used for determining the memory area DDD. The learning reservation processor 32 stores the confirmation result as reserve area information in the second memory portion 20.

Further, when the computer is started up, the learning reservation processor 32 reads out reserve area information from the second memory portion 20 and outputs the reserve area information to the memory allocation processor 31.

Here, the reserve area information created by the learning reservation processor 32 will be further described. As described above, the reserve area information is used for specifying the memory area causing the fragmentation as a result of the memory area allocation and release. Therefore, when the computer is started up, and the first memory portion 10 is initialized, the memory allocation processor 31 reserves a memory area causing the fragmentation to a front end or rear end of the first memory portion 10 according to the reserve area information. Accordingly, for example in the case of FIG. 6C, the memory area DDD is allocated in a front end or rear end of the first memory portion 10, so the unused memory area of 14M is not fragmented into the areas of 6M and 8M. Thus, the reserve area information is information for specifying a memory area which should be reserved by the memory allocation processor 31. Specifically, the reserve area information includes a size, block number information, and the order of allocation of the memory area which should be reserved. Of course, the reserve area information may include information regarding a plurality of memory areas which should be reserved.

The second memory portion 20 of the memory management unit 1 according to the present embodiment includes a nonvolatile memory which stores the above-described reserve area information. Under control of the learning reservation processor 32, the second memory portion 20 manages and controls the reserve area information created by the learning reservation processor 32 to be readable and writable in a form of table.

As described above, in the memory management unit 1 according to the present embodiment, the memory allocation processor 31 reserves a reserved memory area which should be reserved in the front end or rear end of the memory area of the first memory portion 10 according to the reserve area information obtained from the learning reservation processor 32, and it actually allocates the reserved memory area in accordance with an allocation request regarding the reserved memory area when the allocation request regarding the reserved memory area is inputted.

Figure 2A:
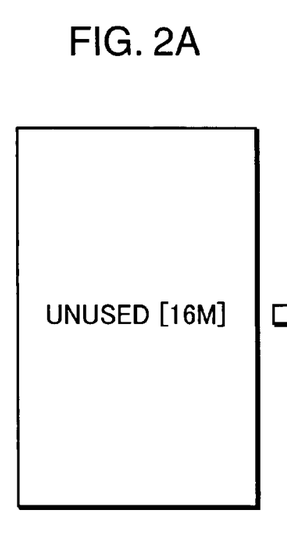
FIGS. 2A, 2B, and 2C show an operation of the memory management unit according to the first embodiment of the present invention.
Figure 2B:
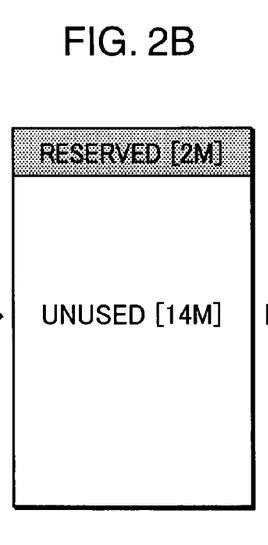
Figure 2C:
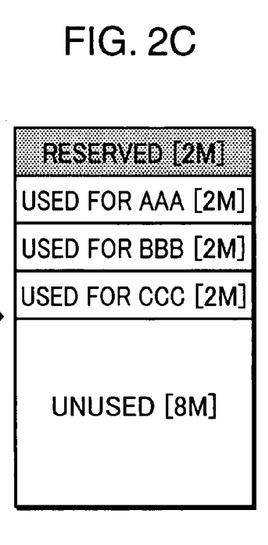
Figure 3A:
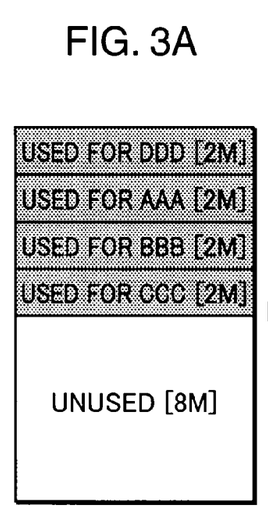
FIGS. 3A and 3B show an operation of the memory management unit according to the first embodiment of the present invention.

For example, as shown in FIG. 6B, when the allocation of the memory area of the first memory portion 10 is executed successively in a sequence of AAA, BBB, CCC, DDD, the first memory portion 10 of 16M is initialized as shown in FIG. 2A when the computer is started up at next time. Then, as shown in FIG. 2B, a memory area corresponding to the memory area DDD of 2M in the fourth place and causing the fragmentation is reserved at a front end of the first memory portion 10. Then, as shown in FIG. 2C, the memory areas are allocated successively in a sequence of AAA, BBB, CCC after the memory area secured in advance. When the memory area of DDD is allocated, the memory area reserved in advance is allocated for the DDD as shown in FIG. 3.

Figure 3B:
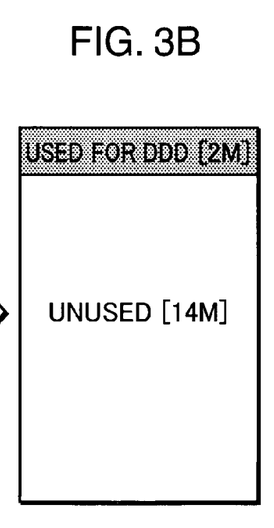

Thus, even when the respective memory areas of AAA, BBB, CCC are released thereafter, three released areas each having 2M are successively added to the unused area of 8M as shown in FIG. 3B, and an unused area of 14M is held. In other words, the fragmentation caused by the memory area DDD is prevented from occurring.

Figure 4:
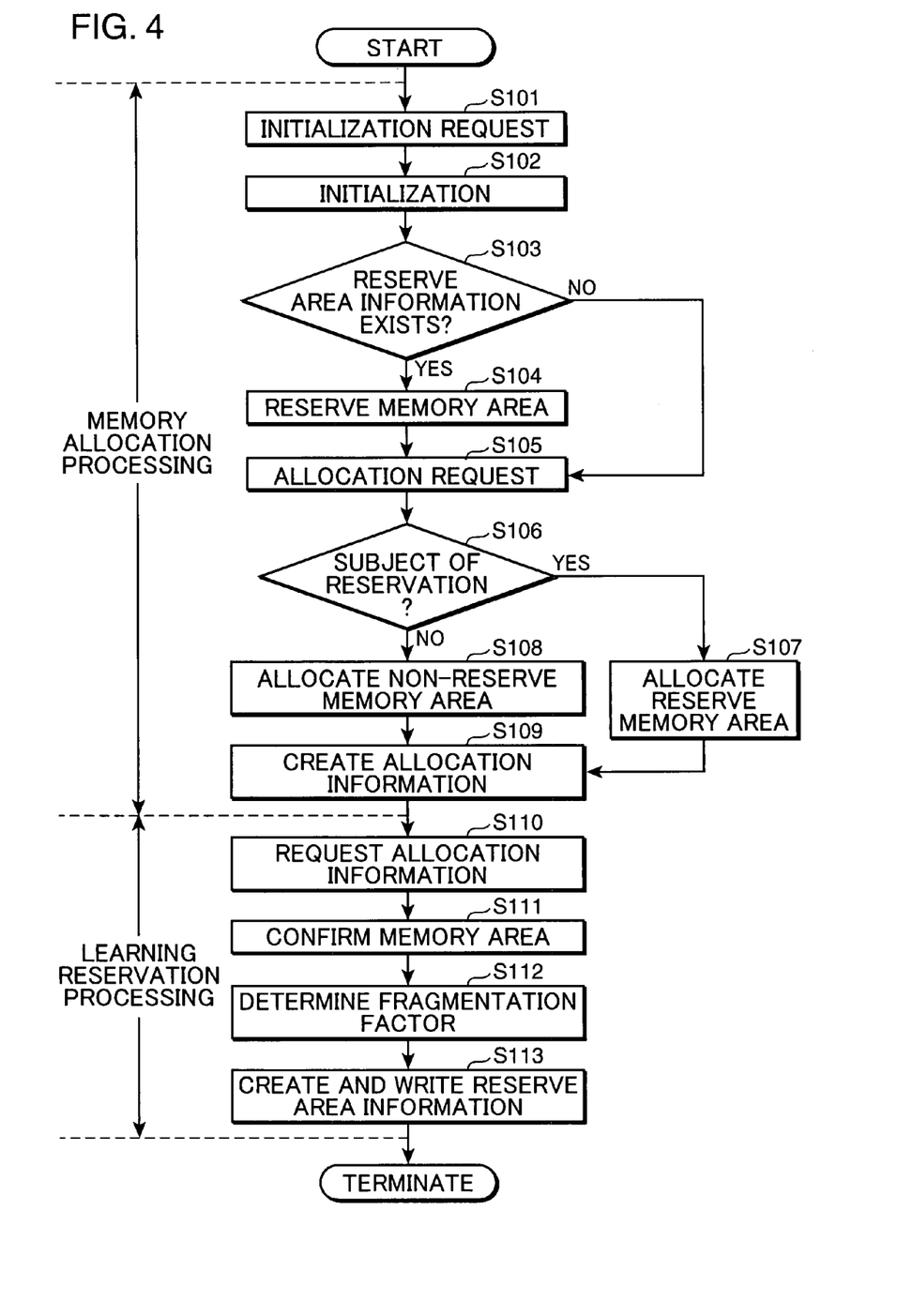
FIG. 4 is a flowchart showing processing steps of an operation of the memory management unit according to the first embodiment of the present invention.

Next, an operation of the memory management unit according to the present embodiment, in other words, the memory management method according to the present embodiment will be described. FIG. 4 is a flowchart showing processing steps of the operation of the memory management unit according to the present embodiment.

As shown in FIG. 4, when the computer 100 is started up, the CPU 3 executes the OS stored in the HDD 4 to output an initializing request of initializing the first memory portion 10 to the memory allocation processor 31 through the system bus 2 (step S101). Then, the memory allocation processor 31 initializes the first memory portion 10 in accordance with the initializing request (step S102).

Next, when it is determined whether or not reserve area information from the learning reservation processor 32 exists (step S103), and if there exists reserve area information (YES in step S103), the memory allocation processor 31 reserves a reserve memory area specified by the reserve area information in the memory area of the first memory portion 10 (step S104). On the other hand, if there exists no reserve area information (NO in step S103), the routine proceeds directly to step S105.

Next, the CPU 3 outputs an allocation request of the first memory portion 10 to the memory allocation processor 31 through the system bus 2 (step S105). Then, the memory allocation processor 31 determines whether or not the allocation request is a subject of the reserve area information of the above-described step S103 (step S106). If the allocation request is a subject of the reserve area information (YES in step S106), the memory allocation processor 31 allocates the reserved memory area which is reserved in the above-described step S104 (step S107). On the other hand, if the allocation request is not a subject of the reserve area information (NO in step S106), the memory allocation processor 31 allocates an unused memory area other than the reserved memory area which is reserved in the above-described step S104 (step S108).

When the allocation of memory area in the above-described step S107 or step S108 is terminated, the memory allocation processor 31 creates allocation information in accordance with the allocation of the above-described step S107 or S108 and outputs the same to the learning reservation processor 32 (step S109).

The learning reservation processor 32 requests allocation information from the memory allocation processor 31 and obtains the same (step S110). Then, according to the obtained allocation information, the learning reservation processor 32 confirms a size, block number information, and the order of allocation and release of the memory area among the memory area of the first memory portion 10 (step S111). Then, the learning reservation processor 32 refers to the confirmation result and determines a fragmenting memory area generated by the allocation and releasing executed previously and fragments (divides) the memory area of the memory portion 10 (step S112). Then, the learning reservation processor 32 confirms the size, block number information, and the order of allocation of the fragmenting memory area as information for specifying the fragmenting memory area and stores the confirmation result in the second memory portion 20 as reserve area information (step S113).

In such a manner as described above, the operation of the memory management unit according to the present embodiment is executed.

As described above, the memory management unit according to the present embodiment includes: the first memory portion 10 in which a memory area necessary for operation of a device is allocated; the memory allocation processor 31 for holding a memory area in the first memory portion 10 in accordance with an allocation request; the nonvolatile second memory portion 20 which is writable and readable for storing reserve area information; and the learning reservation processor 32 for monitoring through the memory allocation processor 31 a size and the order of allocation and release of the memory area which is allocated or released in the first memory portion 10, creating reserve area information including a memory size of the fragmenting memory area which fragments the first memory portion 10 and stores the reserve area information in the second memory portion 20, and gives an instruction to the memory allocation processor to reserve a reserved memory area in a front end or rear end of the first memory portion 10 on the basis of the reserve area information when the first memory portion 10 is initialized.

Further, the memory allocation processor 31 allocates the reserved memory area necessary for operation of the device corresponding to the allocation request, and the learning reservation processor 32 creates the reserve area information regarding the fragmenting memory area as the memory area in which the order of reserving the memory area of the first memory portion 10 comes to the predetermined order, and re-creates reserve area information at each time the memory area is allocated in accordance with an allocation request.

Therefore, the fragmentation hardly occurs in the first memory portion 10 and can be eliminated. Further, since it becomes easy to select a predetermined device for which a memory area should be reserved, the reserved memory area can be accurately allocated in accordance with an allocation request.

In the memory management unit according to the present embodiment, reserve area information can be created which designates a memory area of the predetermined order as a fragmenting area when the order of allocation of the fragment area fragments the first memory portion 10 is determined. For example, the allocation order of a memory area for the printer 7 is substantially determined, and a parameter setting of the allocated order is not changed frequently. Therefore, the printer 7 has a fixed allocated memory area whose allocation is hardly released. Accordingly, it is easy to create reserve area information if the memory area allocated for operation of the printer 7 is designated as a fragmenting memory area.

Further, in the memory management unit according to the present embodiment, especially when it is applied to a configuration of being operated under control of the real-time OS, the real-time OS can be accurately operated through elimination of fragmentation in the first memory portion 10.

Second Embodiment

Next, a second embodiment of the present invention will be described. In this embodiment, the reserve area information of the above-described first embodiment is created respectively in accordance with a size (capacity) of the fragmenting memory area. An overall configuration of the memory management unit according to the present embodiment is the same as the configuration shown in FIG. 1, description will be omitted.

Figure 5A:
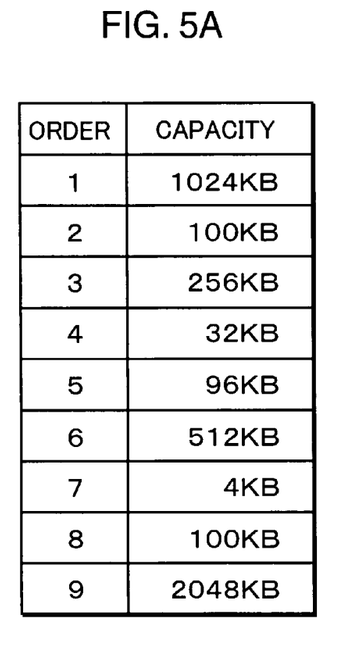
FIGS. 5A and 5B show an operation of a memory management unit according to a second embodiment of the present invention.
Figure 5B:
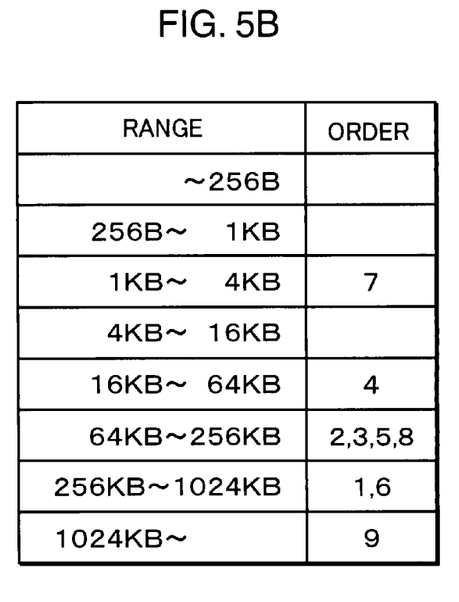

In the memory management unit according to the present embodiment, when allocation requests of a plurality of memory areas for respective sizes are outputted to the memory allocation processor 31 for nine times, specifically, for respective sizes of 1024 KB for the first time, 100 KB for the second time, 256 KB for the third time, 32 KB for the fourth time, 96 KB for the fifth time, 512 KB for the sixth time, 4 KB for the seventh time, 100 KB for the eighth time, 2048 KB for the ninth time, as shown in FIG. 5A as an example, relevance information is created. As shown in FIG. 5B, ranges of sizes of a plurality of memory areas "-256 B", "256 B-1 KB", "1 KB-4 KB", "4 KB-16 KB", "16 KB-64 KB", "64 KB-256 KB", "256 KB-1024 KB", "1024 KB-" which are increasing gradually, are provided, and the relevance information shows which one of the ranges is relevant to each of the sizes of the allocated memory areas. Further, reserve area information is created in accordance with a range to which the fragmenting memory area which fragments the first memory portion 10 falls. Each of the first values of the ranges in FIG. 5B is not included. It means that the range is within the values larger than the first values. For example, the range "256 B-1 KB" means that the value is greater than 256 B and equal to or smaller than 1 KB.

Consequently, since there is no need to count sizes of respective memory areas allocated in accordance with the allocation requests in the memory management unit, there is an advantage that management can be easily performed and the processing speed is not lowered.

With reference to the above-described embodiments, the present invention will be summarized as follows. In other words, the memory management unit according to the present invention comprises: a first memory portion in which a memory area necessary for operating a device is allocated; a memory allocation processor for allocating a memory area in the first memory portion in accordance with an allocation request inputted when the device is operated, and releasing the memory area allocated in the first memory portion in accordance with a releasing request inputted when the operation of the device is terminated; a second memory portion for storing reserve area information regarding a memory area which should be reserved in an upper or lower address area of the first memory portion for operation of a device; and a learning reservation processor for monitoring the memory area allocation and release executed by the memory allocation processor, determining a memory area which is necessary for the operation of a device and fragments the first memory portion, and allowing information regarding the determined memory area to be stored as the reserve area information in the second memory portion. The learning reservation processor gives an instruction to the memory allocation processor to reserve a memory area according to the reserve area information in the upper or lower address area of the first memory portion when the first memory portion is initialized, and the memory allocation processor reserves the memory area according to the reserve area information in the upper or lower address area of the first memory portion in accordance with the instruction given by the learning reservation processor.

In the above-described memory management unit, the memory allocation processor allocates and releases a memory area in the first memory portion in accordance with an allocation request, and the learning reservation processor monitors the memory area allocation and release in the first memory portion, creates reserve area information regarding the memory area which fragments the first memory portion, stores the reserve area information in the second memory portion, and gives an instruction to the memory allocation processor to reserve the memory area according to the reserve area information in the upper or lower address area of the first memory portion when the first memory portion is initialized. Accordingly, the fragmentation of the first memory portion can be suppressed.

It is preferable that the learning reservation processor determines, as the memory area which fragments the first memory portion, a memory area necessary for operation of a certain device which is in a predetermined order of allocation request input sequence after the first memory portion is initialized.

In this case, a fragmentation of the first memory portion, which is caused by allocation and release of a memory area necessary for an operation of a device which is in a predetermined order of allocation request input sequence, can be suppressed.

It is preferable that the learning reservation processor renews the reserve area information each time the allocation and release of the memory area in the first memory portion is executed.

In this case, reserve area information which is suitable for a use condition of memory area in the first memory portion can be created. Accordingly, the fragmentation of the first memory portion can be suppressed more effectively.

It is preferable that the reserve area information includes information identifying a capacity of the memory area which should be reserved in the first memory portion.

In this case, a memory area which should be reserved in the first memory portion can be reserved accurately.

It is preferable that the memory allocation processor allocates the reserved memory area in the first memory portion in accordance with an inputted allocation request for an operation of the device requiring the memory area specified by the reserve area information.

In this case, the memory area which is reserved for the device can be allocated accurately.

It is preferable that the memory allocation processor and the learning reservation processor are operable when a real-time operating system is executed.

In this case, an accurate operation of the real-time operating system can be secured.

It is preferable that the device which requires the memory area specified by the reserve area information includes a printer.

In this case, since the order of allocation request input sequence of memory area necessary for operation of a printer is fixed, the fragmentation of the first memory portion can be eliminated accurately.

The memory management unit according to the present invention includes: a first memory portion in which a memory area necessary for operation of a device is allocated; a memory allocation processor for allocating the memory area in the first memory portion in accordance with an allocation request inputted when the device is operated, and releasing the memory area allocated in the first memory portion in accordance with a releasing request inputted when the operation of the device is terminated; a second memory portion for storing reserve area information regarding a memory area which should be reserved in an upper or lower address area of the first memory portion for operation of a device; and a learning reservation processor for monitoring the memory area allocation and release executed by the memory allocation processor, determining a memory area which is necessary for operation of a device and fragments the first memory portion, and allowing information regarding the capacity range of a plurality of gradually increasing capacity ranges in which the capacity of the determined memory area falls to be stored in the second memory portion as the reserve area information. The learning reservation processor gives an instruction to the memory allocation processor to reserve the memory area having the capacity range specified by the reserve area information in the upper or lower address area of the first memory portion when the first memory portion is initialized, and the memory allocation processor reserves the memory area having the capacity range specified by the reserve area information in the upper or lower address area of the first memory portion in accordance with the instruction given by the learning reservation processor.

In the above-described memory management unit the memory allocation processor executes allocation and release of memory area in the first memory portion in accordance with an allocation request, and the learning reservation processor monitors the memory area allocation and release in the first memory portion, creates reservation area information regarding the capacity range of a plurality of gradually increasing capacity ranges in which the capacity of the memory area which fragments the first memory portion falls, and stores the reserve area information in the second memory portion. Further, the learning reservation processor gives an instruction to the memory allocation processor to reserve the memory area having the capacity range specified by the reservation information in the upper or lower address area of the first memory portion when the first memory portion is initialized. Accordingly, the fragmentation of the first memory portion can be suppressed.

It is preferable that the capacity of a memory area having the capacity range specified by the reserve area information is in the maximum one of the plurality of capacity ranges.

In this case, assured memory area allocation and elimination of memory area fragmentation in the first memory portion is possible.

It is preferable that the learning reservation processor determines, as the memory area which fragments the first memory portion, a memory area necessary for operation of a device which is in a predetermined order of allocation request input sequence after the first memory portion is initialized.

In this case, a fragmentation of the first memory portion, which is caused by allocation and release of a memory area necessary for an operation of a device which is in a predetermined order of allocation request input sequence, can be suppressed.

It is preferable that the learning reservation processor renews the reserve area information each time the allocation and release of the memory area in the first memory portion is executed.

In this case, reserve area information which is suitable for a use condition of memory area in the first memory portion can be created. Accordingly, the fragmentation of the first memory portion can be suppressed more effectively.

It is preferable that the memory allocation processor allocates the reserved memory area in the first memory portion in accordance with an inputted allocation request for an operation of the device requiring the memory area having the capacity range specified by the reserve area information.

In this case, the memory area which is reserved for the device can be allocated accurately.

It is preferable that the memory allocation processor and the learning reservation processor are operable when a real-time operating system is executed.

In this case, an accurate operation of the real-time operating system can be secured.

It is preferable that the device which requires the memory area having the capacity range specified by the reserve area information includes a printer.

In this case, since the order of allocation request input sequence of memory area necessary for operation of a printer is fixed, the fragmentation of the first memory portion can be eliminated accurately.

A memory management method according to the present invention includes a memory management method of a memory management unit including: a first memory portion in which a memory area necessary for operation of a device is allocated; and a second memory portion for storing reserve area information regarding a memory area which should be reserved in an upper or lower address area of the first memory portion for operation of a device, the memory management method comprising the steps of: executing a memory allocation processing of allocating a memory area in the first memory portion in accordance with an allocation request inputted the device is operated, and releasing the memory area allocated in the first memory portion in accordance with a releasing request inputted the operation of the device is terminated; and executing a learning reservation processing of monitoring the memory area allocation and release executed by the memory allocation processor, determining a memory area which is necessary for operation of a device and fragments the first memory portion, and allowing information regarding the determined memory area to be stored as the reserve area information in the second memory portion. The step of executing the learning reservation processing includes a step of giving an instruction to reserve a memory area according to the reserve area information in the upper or lower address area of the first memory portion when the first memory portion initialized, and the step of executing the memory allocation processing includes a step of reserving the memory area according to the reserve area information in the upper or lower address area of the first memory portion.

Since the above-described memory management method includes the steps of executing memory allocation and release processing in the first memory portion in accordance with an allocation request, monitoring the memory area allocation and release in the first memory portion, creating reserve area information regarding a memory area which fragments the first memory portion, allowing the reserve area information to be stored in the second memory portion, and giving an instruction of holding the memory area according to the reserve area information in the upper or lower address area of the memory portion when the first memory portion is initialized, fragmentation of the first memory portion can be suppressed.

A memory management method according to the present invention includes a memory management method of a memory management unit including: a first memory portion in which a memory area necessary for operation of a device is allocated; and a second memory portion for storing reserve area information regarding a memory area which should be reserved in an upper or lower address area of the first memory portion for operation of a device, the memory management method comprising the steps of: executing a memory allocation processing of allocating the memory area in the first memory portion in accordance with an allocation request inputted when the device is operated, and releasing the memory area allocated in the first memory portion in accordance with a releasing request inputted when the operation of the device is terminated; and executing a learning reservation processing of monitoring the memory area allocation and release in the first memory portion, determining a memory area which is necessary for operation of a device and fragments the first memory portion, and allowing information regarding the capacity range of a plurality of gradually increasing capacity ranges in which the capacity of the determined memory area falls to be stored in the second memory portion as the reserve area information. The step of executing the learning reservation processing includes a step of giving an instruction to reserve the memory area having the capacity range specified by the reserve area information in the upper or lower address area of the first memory portion when the first memory portion is initialized, and the step of executing the memory allocation processing includes a step of reserving the memory area having the capacity range specified by the reserve area information in the upper or lower address area of the first memory portion.

Since the above-described memory management method includes the steps of executing memory allocation and release processing in the first memory portion in accordance with an allocation request, monitoring the memory area allocation and release in the first memory portion, creating reserve area information regarding a capacity range of a plurality of gradually increasing capacities in which the capacity of the memory area which fragments the first memory portion falls, allowing the reserve area information to be stored in the second memory portion, and giving an instruction of holding the memory area according to the reserve area information in the upper or lower address area of the memory portion when the first memory portion is initialized, fragmentation of the first memory portion can be suppressed.

This application is based on Japanese Patent application serial Nos. 2006-264585 and 2006-264591 both filed in Japan Patent Office on Sep. 28, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A memory management unit, comprising:
a first memory portion in which a memory area necessary for operating a device is allocated;
a memory allocation processor for allocating a memory area in the first memory portion in accordance with an allocation request inputted when the device is operated, and releasing the memory area allocated in the first memory portion in accordance with a releasing request inputted when the operation of the device is terminated;
a second memory portion for storing reserve area information regarding a memory area which should be reserved in an upper or lower address area of the first memory portion for operation of a device; and
a learning reservation processor for monitoring the memory area allocation and release executed by the memory allocation processor, determining a memory area which is necessary for the operation of a device and fragments the first memory portion, and allowing information regarding the determined memory area to be stored as the reserve area information in the second memory portion, wherein
the learning reservation processor gives an instruction to the memory allocation processor to reserve a memory area according to the reserve area information in the upper or lower address area of the first memory portion when the first memory portion is initialized, and
the memory allocation processor reserves the memory area according to the reserve area information in the upper or lower address area of the first memory portion in accordance with the instruction given by the learning reservation processor.

2. The memory management unit according to claim 1, wherein the learning reservation processor determines, as the memory area which fragments the first memory portion, a memory area necessary for operation of a certain device which is in a predetermined order of allocation request input sequence after the first memory portion is initialized.

3. The memory management unit according to claim 2, wherein the learning reservation processor renews the reserve area information each time the allocation and release of the memory area in the first memory portion is executed.

4. The memory management unit according to claim 1, wherein the reserve area information includes information identifying a capacity of the memory area which should be reserved in the first memory portion.

5. The memory management unit according to claim 1, wherein the memory allocation processor allocates the reserved memory area in the first memory portion in accordance with an inputted allocation request for an operation of the device requiring the memory area specified by the reserve area information.

6. The memory management unit according to claim 1, wherein the memory allocation processor and the learning reservation processor are operable when a real-time operating system is executed.

7. The memory management unit according to claim 1, wherein the device which requires the memory area specified by the reserve area information includes a printer.

8. A memory management unit, comprising:
a first memory portion in which a memory area necessary for operation of a device is allocated;
a memory allocation processor for allocating the memory area in the first memory portion in accordance with an allocation request inputted when the device is operated, and releasing the memory area allocated in the first memory portion in accordance with a releasing request inputted when the operation of the device is terminated;
a second memory portion for storing reserve area information regarding a memory area which should be reserved in an upper or lower address area of the first memory portion for operation of a device; and
a learning reservation processor for monitoring the memory area allocation and release executed by the memory allocation processor, determining a memory area which is necessary for operation of a device and fragments the first memory portion, and allowing information regarding the capacity range of a plurality of gradually increasing capacity ranges in which the capacity of the determined memory area falls to be stored in the second memory portion as the reserve area information, wherein
the learning reservation processor gives an instruction to the memory allocation processor to reserve the memory area having the capacity range specified by the reserve area information in the upper or lower address area of the first memory portion when the first memory portion is initialized, and
the memory allocation processor reserves the memory area having the capacity range specified by the reserve area information in the upper or lower address area of the first memory portion in accordance with the instruction given by the learning reservation processor.

9. The memory management unit according to claim 8, wherein the capacity of a memory area having the capacity range specified by the reserve area information is in the maximum one of the plurality of capacity ranges.

10. The memory management unit according to claim 8, wherein the learning reservation processor determines, as the memory area which fragments the first memory portion, a memory area necessary for operation of a device which is in a predetermined order of allocation request input sequence after the first memory portion is initialized.

11. The memory management unit according to claim 10, wherein the learning reservation processor renews the reserve area information each time the allocation and release of the memory area in the first memory portion is executed.

12. The memory management unit according to claim 8, wherein the memory allocation processor allocates the reserved memory area in the first memory portion in accordance with an inputted allocation request for an operation of the device requiring the memory area having the capacity range specified by the reserve area information.

13. The memory management unit according to claim 8, wherein the memory allocation processor and the learning reservation processor are operable when a real-time operating system is executed.

14. The memory management unit according to claim 8, wherein the device which requires the memory area having the capacity range specified by the reserve area information includes a printer.

15. A memory management method of a memory management unit including: a first memory portion in which a memory area necessary for operation of a device is allocated; and a second memory portion for storing reserve area information regarding a memory area which should be reserved in an upper or lower address area of the first memory portion for operation of a specified device, the memory management method comprising the steps of:
executing a memory allocation processing of allocating a memory area in the first memory portion in accordance with an allocation request inputted the device is operated, and releasing the memory area allocated in the first memory portion in accordance with a releasing request inputted the operation of the device is terminated; and
executing a learning reservation processing of monitoring the memory area allocation and release executed by the memory allocation processor, determining a memory area which is necessary for operation of a device and fragments the first memory portion, and allowing information regarding the determined memory area to be stored as the reserve area information in the second memory portion, wherein
the step of executing the learning reservation processing includes a step of giving an instruction to reserve a memory area according to the reserve area information in the upper or lower address area of the first memory portion when the first memory portion initialized, and
the step of executing the memory allocation processing includes a step of reserving the memory area according to the reserve area information in the upper or lower address area of the first memory portion.

16. A memory management method of a memory management unit including: a first memory portion in which a memory area necessary for operation of a device is allocated; and a second memory portion for storing reserve area information regarding a memory area which should be reserved in an upper or lower address area of the first memory portion for operation of a device, the memory management method comprising the steps of:
executing a memory allocation processing of allocating the memory area in the first memory portion in accordance with an allocation request inputted when the device is operated, and releasing the memory area allocated in the first memory portion in accordance with a releasing request inputted when the operation of the device is terminated; and executing a learning reservation processing of monitoring the memory area allocation and release in the first memory portion, determining a memory area which is necessary for operation of a device and fragments the first memory portion, and allowing information regarding the capacity range of a plurality of gradually increasing capacity ranges in which the capacity of the determined memory area falls to be stored in the second memory portion as the reserve area information, wherein the step of executing the learning reservation processing includes a step of giving an instruction to reserve the memory area having the capacity range specified by the reserve area information in the upper or lower address area of the first memory portion when the first memory portion is initialized, and the step of executing the memory allocation processing includes a step of reserving the memory area having the capacity range specified by the reserve area information in the upper or lower address area of the first memory portion.

* * * * *